United States Patent [19]

Larsen et al.

[11] Patent Number: 4,697,551
[45] Date of Patent: Oct. 6, 1987

[54] QUICK-RESPONSE CONTROL SYSTEM FOR LOW-FLOW ENGINE COOLANT SYSTEMS

[75] Inventors: Hals N. Larsen, County of King; Donald L. Stephens, County of Skagit, both of Wash.

[73] Assignee: Paccar Inc, Bellevue, Wash.

[21] Appl. No.: 745,928

[22] Filed: Jun. 18, 1985

[51] Int. Cl.$^4$ .................................................. F01P 3/12
[52] U.S. Cl. .................................. 123/41.31; 60/599; 123/63
[58] Field of Search ............... 123/41.31, 41.08, 41.1, 123/563; 60/599

[56] References Cited

U.S. PATENT DOCUMENTS

| | | | |
|---|---|---|---|
| 3,712,282 | 1/1973 | Isley | 123/563 |
| 3,752,132 | 8/1973 | Bentz et al. | 123/41.1 |
| 3,872,835 | 3/1975 | Deutschmann | 123/41.31 |
| 4,000,725 | 1/1977 | Harris | 123/563 |
| 4,180,032 | 12/1979 | Plegat | 123/559 |
| 4,236,492 | 12/1980 | Tholen | 123/563 |
| 4,273,082 | 6/1981 | Tholen | 123/41.31 |
| 4,286,551 | 9/1981 | Blitz | 123/41.31 |
| 4,317,439 | 3/1982 | Emmerling | 123/563 |
| 4,325,219 | 4/1982 | Stang et al. | 60/599 |
| 4,348,991 | 9/1982 | Stang et al. | 123/41.29 |
| 4,362,131 | 12/1982 | Mason et al. | 123/41.1 |
| 4,413,596 | 11/1983 | Hirayama | 123/41.1 |
| 4,517,929 | 5/1985 | Musick et al. | 60/599 |
| 4,520,767 | 6/1985 | Roettgen et al. | 123/41.31 |

FOREIGN PATENT DOCUMENTS

| | | |
|---|---|---|
| 0126620 | 11/1984 | European Pat. Off. . |
| 2335248 | 1/1975 | Fed. Rep. of Germany ...... 123/563 |
| WO80/00863 | 5/1980 | PCT Int'l Appl. . |
| 038939A | 7/1980 | United Kingdom . |
| 1574045 | 9/1980 | United Kingdom . |
| 101293A | 1/1983 | United Kingdom . |

Primary Examiner—William A. Cuchlinski, Jr.
Attorney, Agent, or Firm—Seed and Berry

[57] ABSTRACT

A method and apparatus for quickly adjusting the coolant flow in a tuned, low-flow coolant system to maintain the temperature of air leaving an aftercooler at a desired temperature and for maintaining the temperature of an engine block within a predetermined range, during various engine loads and ambient temperatures. The invention employs a quick-acting, proportional radiator shuttle valve to mix hot coolant from the radiator input with cool coolant from the radiator output for application to the aftercooler and a quick-acting aftercooler shuttle valve to mix cool coolant from the radiator output with coolant from the aftercooler for application to the engine block.

3 Claims, 1 Drawing Figure

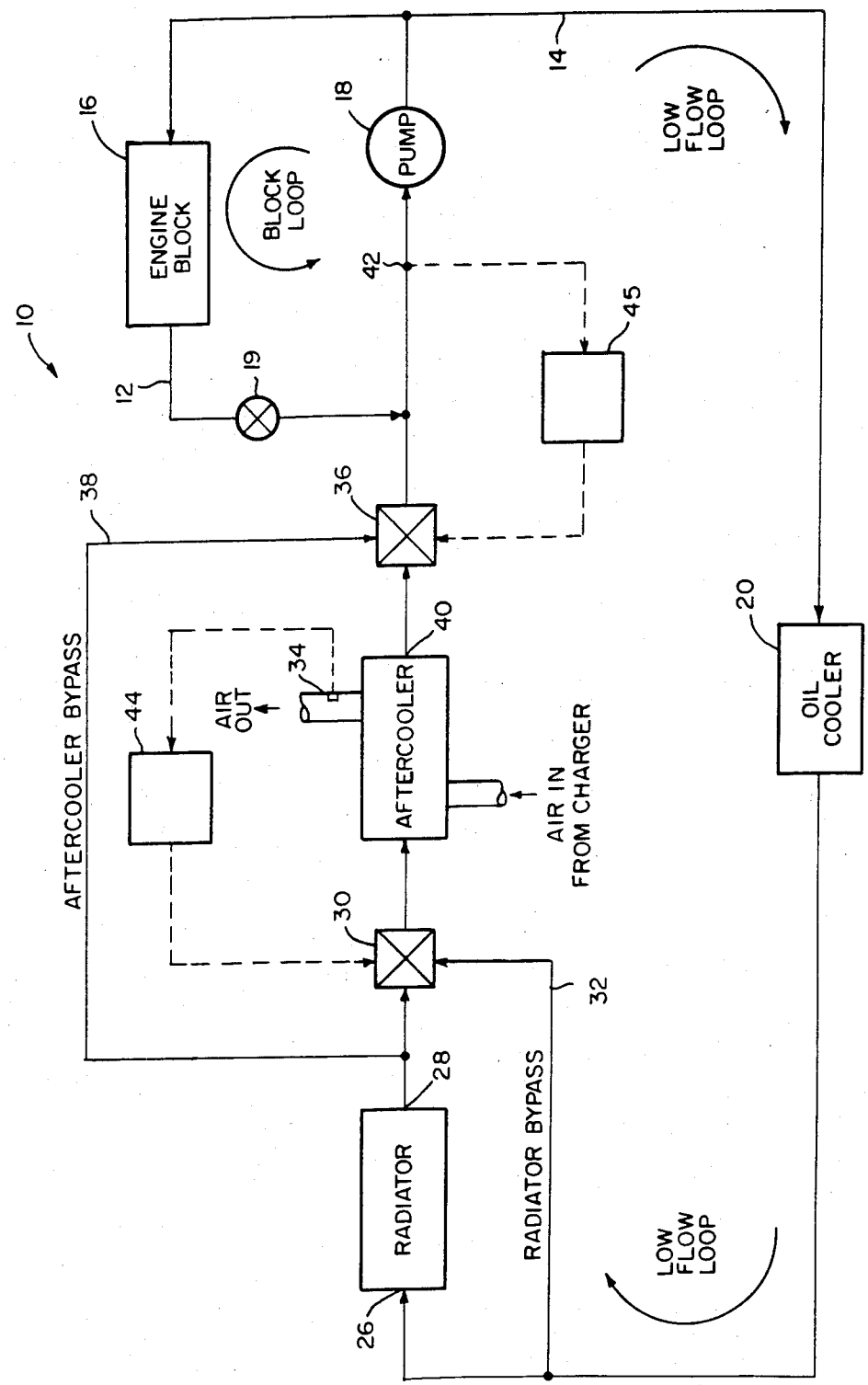

4,697,551

QUICK-RESPONSE CONTROL SYSTEM FOR LOW-FLOW ENGINE COOLANT SYSTEMS

TECHNICAL FIELD

The invention relates to a method and apparatus for controlling the temperature of an engine block and an aftercooler in an internal-combustion engine. Specifically, the invention relates to apparatus and a method for quickly adjusting the coolant flow in a tuned, low-flow coolant system to maintain the temperature of air leaving an aftercooler at a desired temperature and for maintaining the temperature of an engine block within a predetermined range, during various engine loads and at various ambient temperatures.

BACKGROUND ART

Various engine coolant systems have been designed to maintain the temperature of an engine within a desired range.

It is known that the performance of internal combustion engines can be improved by increasing the density of air entering the combustion chamber. Turbochargers and superchargers have been developed to increase the air entering the combustion chambers. However, an undesirable effect of compressing the air to be applied to the combustion chambers is the heating of the air. It is preferred to maintain the temperature of the engine intake air at a specific temperature for maximum engine efficiency. Thus aftercoolers have been developed to cool the compressed air prior to application of the air to the combustion chambers. Typically, the aftercooler is included in the coolant flow loop for the engine block to maintain the temperature of the charged air near the coolant flow temperature.

Often, the desired operating temperature for the engine block, and thus the temperature of the engine coolant, is not the desired temperature for operation of the aftercooler. Tuned, low-flow coolant systems were designed to alleviate this problem. A typical low-flow coolant system is described in *SAE Technical Paper Series*, 841023, "Selection of the Optimized Aftercooling System for Cummins Premium Diesel Engines," Geoffrey Bond, et al., pp. 4-5, 1984. In the "tuned low-flow system" described in the *Series*, the engine block is in a relatively high-flow coolant loop wherein approximately 90% of the coolant can flow through this loop. A second, low-flow coolant loop is connected in series to the high-flow loop. Approximately 10% of the coolant can flow through the low-flow loop. A single pump pressurizes both loops. The low-flow system has the advantage of allowing a relatively small amount of fluid in the low-flow loop to emerge from the high-flow loop and to pass through the radiator. Thus, in the low-flow system, a relatively small amount of hot fluid passes through the radiator. As a result, the low-flow coolant will undergo a greater temperature drop through a given size radiator than would an entire volume of coolant in a conventional coolant system. Thus the cooler fluid exiting the radiator in the low-flow loop can be used to cool the aftercooler to a temperature (almost ambient) which is substantially below that of the engine block or below that of the radiator discharge in a conventional coolant system.

A disadvantage of conventional tuned, low-flow coolant systems which use conventional thermostatically controlled valves in the inability of such a system to respond quickly to transient changes in engine load. For example, in the case of a truck leaving a level road to begin ascending a steep grade, the aftercooler requires additional cooling immediately to maintain engine performance. When the low-flow loop is used to cool the compressed air in the turbocharger aftercooler, the response time to direct coolant through the radiator for more cooling rather than bypassing the radiator can be minutes because the thermostat valve must first be heated by coolant leaving the engine blocking during this transient increase in load on the engine.

DISCLOSURE OF INVENTION

It is an object of the invention to maintain the temperature of the compressed air leaving a turbocharger aftercooler as close to a predetermined temperature as possible, regardless of engine load or ambient air temperature conditions.

It is an object of the invention to maintain the engine block temperature within a predetermined range during transient load conditions.

It is a further object to provide emergency engine cooling during heavy transient load conditions.

The invention achieves these objectives by providing a tuned, low-flow coolant system having a quick-acting radiator bypass valve which responds to signals from a temperature sensor on the aftercooler air outlet. The valve allows coolant in the low-flow loop to bypass the radiator or to mix with fluid from the radiator to either warm or cool the aftercooler. The bypass valve is a fast-acting valve immediately responsive (a few seconds) to the signal from the temperature sensor and is used as a substitute for the conventional thermostatically controlled bypass valve.

In the preferred embodiment, the invention comprises a quick-response control system for tuned, low-flow coolant systems where a major portion of the coolant flows in a high-flow coolant loop and a minor portion of the coolant flows in a second, connected low-flow loop. The high-flow loop contains the engine block and the low-flow loop contains the radiator and an aftercooler. Means are provided on the aftercooler to sense the temperature of compressed air leaving the aftercooler. The compressed air can be charged by either a turbocharger or a supercharger. A radiator bypass is connected to the quick-acting radiator shuttle valve which can proportionately mix coolant from the radiator and coolant from the radiator bypass according to the signal from the aftercooler temperature-sensing means. The resulting mixture of coolant can be applied to the aftercooler to maintain the temperature of the compressed air leaving the aftercooler at a predetermined temperature. By mixing coolant from the radiator with coolant bypassed around the radiator, the aftercooler can cool or warm the compressed air quickly to the desired temperature. Additionally, on an especially cool day, hot coolant from the radiator bypass can be fed to the aftercooler to warm the compressed air to the desired temperature. Alternatively, on a particularly warm day, the radiator shuttle valve can allow only coolant from the radiator, which is at a low temperature, to flow to the aftercooler, thereby cooling the compressed air as close to the desired temperature as possible. The radiator bypass shuttle valve is feedback controlled by the aftercooler air temperature sensing means to maintain the correct air temperature for maximum engine efficiency.

The quick-response control system also has a quick-acting, proportional aftercooler shuttle valve in the low-flow coolant loop which can bypass coolant out of the radiator around the aftercooler and which can mix coolant from the aftercooler in any ratio with coolant from the radiator. This mixture is then applied directly to the high-flow coolant loop. Means for sensing the temperature of coolant in the engine block are provided to control the aftercooler shuttle valve. Thus, the temperature of the engine block can be maintained within a desired range, regardless of transient loads on the engine or differing ambient air temperatures. The engine block is thus protected should it begin to overheat because the temperature of the coolant after leaving the aftercooler may be considerably higher during heavy engine load conditions. It is estimated, however, that much of the temperature increase in the coolant caused by cooling the air in the aftercooler will result in almost the same amount of engine cooling as if the radiator discharge went directly to the engine block because of the cooler air entering the engine and, therefore, the better efficiency of the engine.

In the preferred embodiment, both the aftercooler shuttle valve and the radiator shuttle valve are electrically operated, proportional solenoid valves which respond to electrical signals from the appropriate sensors.

BRIEF DESCRIPTION OF THE DRAWING

FIG. 1 is a schematic diagram of a tuned, low-flow coolant system employing the quick-response control system of the present invention.

BEST MODE FOR CARRYING OUT THE INVENTION

In the accompanying drawing, a quick-response, tuned, low-flow coolant system employing the present invention is schematically illustrated and generally indicated by reference numeral 10. The coolant system has a relatively high-flow coolant loop 12 and a relatively low-flow coolant loop 14. Approximately 10% of the coolant flows in the low-flow loop. The high-flow loop contains an engine block 16, a pump 18 which pressurizes both the high-flow and the low-flow coolant loops, and a conventional thermostat valve 19. The low-flow coolant loop is connected in series with the high-flow coolant loop. The low-flow coolant loop serially includes an oil cooler 20, a heat exchanger or radiator 22, and an aftercooler 24.

In the low-flow coolant system 10, the coolant in the low-flow loop 14 typically achieves its highest temperature at the radiator input 26 and achieves its lowest temperature at the radiator output 28. The average temperature of coolant in the high-flow coolant loop 12 is typically between or above these two extremes. A quick-acting, proportional radiator shuttle valve 30 is provided to allow all or some of the coolant to pass through the radiator or alternatively through a radiator bypass flow conduit 32. Thus, the radiator shuttle valve can mix relatively cool coolant from the output of the radiator and hot coolant from the input of the radiator and proportionately mix these coolants together for application to the aftercooler 24. The ratio of mixing between the cool output of the radiator and the hot input to the radiator is controlled by an output air temperature sensor 34 that measures air temperature leaving the aftercooler and a conventional valve-actuating controller 44.

The system 10 is also provided with a quick-acting, proportional aftercooler shuttle valve 36. The aftercooler shuttle valve can allow mixing of cool coolant from the radiator output 28 which bypasses the aftercooler with coolant through the aftercooler. The aftercooler shuttle valve is controlled by an engine block temperature sensor 42 and a conventional valve-actuating controller 45. Thus, the aftercooler shuttle valve controls the temperature of coolant entering the high-flow coolant loop to maintain the temperature of the engine within a predetermined range. Additionally, the aftercooler shuttle valve can quickly bypass cool coolant from the radiator output around the aftercooler for direct application to the high-flow loop 12 if the engine block temperature rises beyond a safe operating temperature.

It will be appreciated that other variations and embodiments of the invention as applied to low-flow coolant systems of the type described are contemplated and that this description does not limit the scope of the invention as determined by the claims which follow.

We claim:

1. A quick-response coolant control system for a vehicle engine having a low-flow engine coolant system wherein a major portion of the coolant flows in a high-flow coolant loop containing an engine block and wherein a minor portion of the coolant fluid flows in a connected low-flow coolant loop, serially containing various components, including a radiator and an aftercooler, comprising:

a high-flow coolant loop including an engine block within the high-flow loop;

a low-flow coolant loop connected to the high-flow coolant loop, including a radiator and an aftercooler for cooling engine intake air from a turbocharger;

means for sensing the temperature of air leaving the aftercooler;

a radiator bypass flow conduit to allow coolant fluid in the low-flow coolant loop to bypass the radiator;

a quick-acting, radiator flow control valve in the low-flow loop to mix coolant from the radiator and coolant from the radiator bypass flow conduit to be applied to the aftercooler in response to a signal from the aftercooler temperature-sensing means to maintain the aftercooler at a desired temperature, whereby the compressed air in the after-cooler can be exposed quickly to greatly cooled water from the radiator in the low-flow loop in response to changes in engine load conditions;

an aftercooler bypass flow conduit to allow coolant fluid in the low-flow coolant loop to bypass the aftercooler;

means for sensing the temperature of coolant in the engine block; and a quick-acting, proportional aftercooler shuttle valve in the low-flow coolant loop to proportionally mix coolant from the aftercooler bypass flow conduit and the aftercooler for application to the low-flow coolant loop in response to a signal from the engine block coolant temperature-sensing means to maintain the temperature of the engine block within a desired range.

2. The quick-response control system of claim 1 wherein the quick-acting, proportional shuttle radiator valve and the quick-acting, proportional aftercooler shuttle valve are electrically operated, solenoid-actuated valves.

3. A method for controlling the temperature of air leaving an aftercooler in a low-flow-type coolant system so that the temperature of air leaving the aftercooler is maintained substantially at a desired temperature during transient engine load conditions, comprising the following steps:
   passing a major portion of the coolant through the engine block;
   passing a minor portion of the coolant to a radiator and an air aftercooler or around the radiator to the aftercooler;
   sensing the temperature of the air leaving the aftercooler;
   selectively instantaneously directing the minor portion of the coolant through the radiator to the aftercooler in response to increases in temperature sensed in the air leaving the aftercooler or around the radiator in response to decreases in the temperature sensed in the air leaving the aftercooler to provide instantaneous cooling of the air in the aftercooler for better engine performance during transient engine load change;
   sensing the temperature of the engine block; and
   quickly bypassing coolant around the aftercooler for cooling the engine during high-temperature increases in the engine block.

* * * * *